US012158165B2

(12) United States Patent
Huthmacher

(10) Patent No.: US 12,158,165 B2
(45) Date of Patent: Dec. 3, 2024

(54) CENTRIFUGAL COMPRESSOR WITH LIQUID INJECTION

(71) Applicant: DAIKIN INDUSTRIES, LTD., Osaka (JP)

(72) Inventor: Ryan Huthmacher, Plymouth, MN (US)

(73) Assignee: Daikin Industries, Ltd., Osaka (JP)

( * ) Notice: Subject to any disclaimer, the term of this patent is extended or adjusted under 35 U.S.C. 154(b) by 315 days.

(21) Appl. No.: 17/198,130

(22) Filed: Mar. 10, 2021

(65) Prior Publication Data

US 2022/0290692 A1 Sep. 15, 2022

(51) Int. Cl.

| | |
|---|---|
| ***F04D 29/58*** | (2006.01) |
| ***F04D 29/44*** | (2006.01) |
| ***F04D 29/68*** | (2006.01) |
| ***F25B 1/053*** | (2006.01) |
| ***F25B 1/10*** | (2006.01) |
| ***F25B 31/00*** | (2006.01) |

(52) U.S. Cl.

CPC ....... *F04D 29/5846* (2013.01); *F04D 29/441* (2013.01); *F04D 29/684* (2013.01); *F25B 1/053* (2013.01); *F25B 1/10* (2013.01); *F25B 31/008* (2013.01); *F05D 2250/52* (2013.01); *F25B 2400/07* (2013.01); *F25B 2400/13* (2013.01)

(58) Field of Classification Search

CPC .. F04D 29/5846; F04D 29/441; F04D 29/684; F25B 31/008

See application file for complete search history.

(56) References Cited

U.S. PATENT DOCUMENTS

| | | | | |
|---|---|---|---|---|
| 7,326,027 | B1 * | 2/2008 | Skoch | F04D 29/444 415/48 |
| 2006/0277941 | A1 | 12/2006 | Lifson et al. | |
| 2007/0140889 | A1 | 6/2007 | Chen et al. | |
| 2010/0115975 | A1 | 5/2010 | Mitra et al. | |
| 2012/0227427 | A1 | 9/2012 | Liu et al. | |
| 2013/0036760 | A1 | 2/2013 | Sun et al. | |
| 2013/0125570 | A1 | 5/2013 | Doty et al. | |

(Continued)

FOREIGN PATENT DOCUMENTS

| | | | |
|---|---|---|---|
| CN | 103498817 | A | 1/2014 |
| CN | 203516222 | U | 4/2014 |

(Continued)

OTHER PUBLICATIONS

Written Opinion for the corresponding international application No. PCT/US2022/00937, issued on Jun. 15, 2022.

(Continued)

*Primary Examiner* — Kenneth J Hansen

(74) *Attorney, Agent, or Firm* — Global IP Counselors, LLP

(57) ABSTRACT

A centrifugal compressor for a chiller includes an impeller, a motor, a diffuser, and at least one injection port. The impeller is attached to a shaft rotatable about a rotation axis. The motor is arranged and configured to rotate the shaft in order to rotate the impeller. The diffuser is disposed downstream from the impeller. The at least one injection port is located within the diffuser. The at least one injection port is configured and arranged to supply liquid refrigerant into the diffuser from a condenser or an economizer of the chiller.

1 Claim, 7 Drawing Sheets

(56) References Cited

U.S. PATENT DOCUMENTS

| | | | | |
|---|---|---|---|---|
| 2017/0198720 | A1* | 7/2017 | Umeda | F04D 17/10 |
| 2017/0248355 | A1* | 8/2017 | Knopp | F25B 49/022 |
| 2019/0195243 | A1* | 6/2019 | Tokuyama | F04D 29/5846 |

FOREIGN PATENT DOCUMENTS

| | | | | |
|---|---|---|---|---|
| JP | 58-214697 | A | 12/1983 | |
| JP | 2004-300929 | A | 10/2004 | |
| WO | WO-2012060825 | A1 * | 5/2012 | F01D 17/08 |
| WO | WO-2012166858 | A1 * | 12/2012 | F04D 25/06 |

OTHER PUBLICATIONS

International Search Report for the corresponding international application No. PCT/US2022/00937, issued on Jun. 15, 2022.

* cited by examiner

CENTRIFUGAL COMPRESSOR WITH LIQUID INJECTION

BACKGROUND

Field of the Invention

The present invention generally relates to a centrifugal compressor. More specifically, the present invention relates to a centrifugal compressor with liquid injection.

Background Information

A chiller system is a refrigerating machine or apparatus that removes heat from a medium. Commonly, a liquid, such as water, is used as the medium and the chiller system operates in a vapor-compression refrigeration cycle. This liquid can then be circulated through a heat exchanger to cool air or equipment as required. As a necessary byproduct, refrigeration creates waste heat that must be exhausted to ambient or, for greater efficiency, recovered for heating purposes. A conventional chiller system often utilizes a centrifugal compressor, which is often referred to as a turbo compressor. Thus, such chiller systems can be referred to as turbo chillers. Alternatively, other types of compressors, e.g. a screw compressor, can be utilized.

In a conventional (turbo) chiller, refrigerant is compressed in the centrifugal compressor and sent to a heat exchanger in which heat exchange occurs between the refrigerant and a heat exchange medium (liquid). This heat exchanger is referred to as a condenser because the refrigerant condenses in this heat exchanger. As a result, heat is transferred to the medium (liquid) so that the medium is heated. Refrigerant exiting the condenser is expanded by an expansion valve and sent to another heat exchanger in which heat exchange occurs between the refrigerant and a heat exchange medium (liquid). This heat exchanger is referred to as an evaporator because refrigerant is heated (evaporated) in this heat exchanger. As a result, heat is transferred from the medium (liquid) to the refrigerant, and the liquid is chilled. The refrigerant from the evaporator is then returned to the centrifugal compressor and the cycle is repeated. The liquid utilized is often water.

A conventional centrifugal compressor basically includes a casing, an inlet guide vane, an impeller, a diffuser, a motor, various sensors and a controller. Refrigerant flows in order through the inlet guide vane, the impeller and the diffuser. Thus, the inlet guide vane is coupled to a gas intake port of the centrifugal compressor while the diffuser is coupled to a gas outlet port of the impeller. The inlet guide vane controls the flow rate of refrigerant gas into the impeller. The impeller increases the velocity of refrigerant gas. The diffuser works to transform the velocity of refrigerant gas (dynamic pressure), given by the impeller, into (static) pressure. The motor rotates the impeller. The controller controls the motor, the inlet guide vane and the expansion valve. In this manner, the refrigerant is compressed in a conventional centrifugal compressor. The inlet guide vane is typically adjustable and the motor speed is typically adjustable to adjust the capacity of the system. In addition, the diffuser may be adjustable to further adjust the capacity of the system. The controller controls the motor, the inlet guide vane and the expansion valve. The controller can further control any additional controllable elements.

SUMMARY

Flow separation and pressure waves generated at a trailing edge of the impeller in a conventional centrifugal compressor can cause compression noise. An isolation cover or a micro girth liquid film have been used to suppress compression noise.

An object of the present invention is to suppress noise in a centrifugal compressor.

In view of the state of the known technology, one aspect of the present disclosure is to provide a centrifugal compressor adapted to be used in a chiller. The centrifugal compressor includes an impeller, a motor and a diffuser. The impeller is attached to a shaft rotatable about a rotation axis. The motor is arranged and configured to rotate the shaft in order to rotate the impeller. The diffuser is disposed downstream from the impeller. At least one injection port is located within the diffuser. The at least one injection port is configured and arranged to supply liquid refrigerant into the diffuser from a condenser or an economizer of the chiller.

Another aspect of the present invention is to provide a two-stage chiller. The two-stage chiller includes a first centrifugal compressor and a second centrifugal compressor. The first centrifugal compressor includes a first impeller and a first diffuser. The first impeller is rotatable about a first rotation axis. The first diffuser is disposed downstream from the first impeller. The second centrifugal compressor includes a second impeller and a diffuser. The second impeller is rotatable about a second rotation axis. The second diffuser is disposed downstream from the second impeller. At least one motor is arranged and configured to rotate the first impeller and the second impeller. A return channel flow path connects the first diffuser to the second impeller. The two-stage chiller further includes a condenser and an economizer. An evaporator is connected in series with the first stage centrifugal compressor, the second stage centrifugal compressor, the condenser, and the economizer. At least one injection port is located within at least one of the first diffuser, the return channel flow path, and the second diffuser. At least one injection passage is connected to the at least one injection port. The at least one injection passage is arranged and configured to deliver liquid refrigerant from at least one of the condenser and the economizer.

Another aspect of the present invention is to provide a two-stage compressor adapted to be used in a chiller. The two-stage compressor includes a first stage centrifugal compressor, a second stage centrifugal compressor, at least one motor, and a plurality of injection ports. The first stage centrifugal compressor includes a first impeller and a first diffuser. The first impeller is rotatable about a first rotation axis. The first diffuser is disposed downstream from the first impeller. The first diffuser has a first upstream edge and a first downstream edge. The second stage centrifugal compressor includes a second impeller and a second diffuser. The second impeller is rotatable about a second rotation axis. The second diffuser is disposed downstream from the second impeller. The second diffuser has a second upstream edge and a second downstream edge. The at least one motor is arranged and configured to rotate the first impeller and the second impeller. The plurality of injection ports are located within the second diffuser downstream of the second upstream edge of the second diffuser to deliver liquid refrigerant to the second diffuser.

These and other objects, features, aspects and advantages of the present invention will become apparent to those skilled in the art from the following detailed description, which, taken in conjunction with the annexed drawings, discloses preferred embodiments.

BRIEF DESCRIPTION OF THE DRAWINGS

Referring now to the attached drawings which form a part of this original disclosure.

DETAILED DESCRIPTION OF EMBODIMENT(S)

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
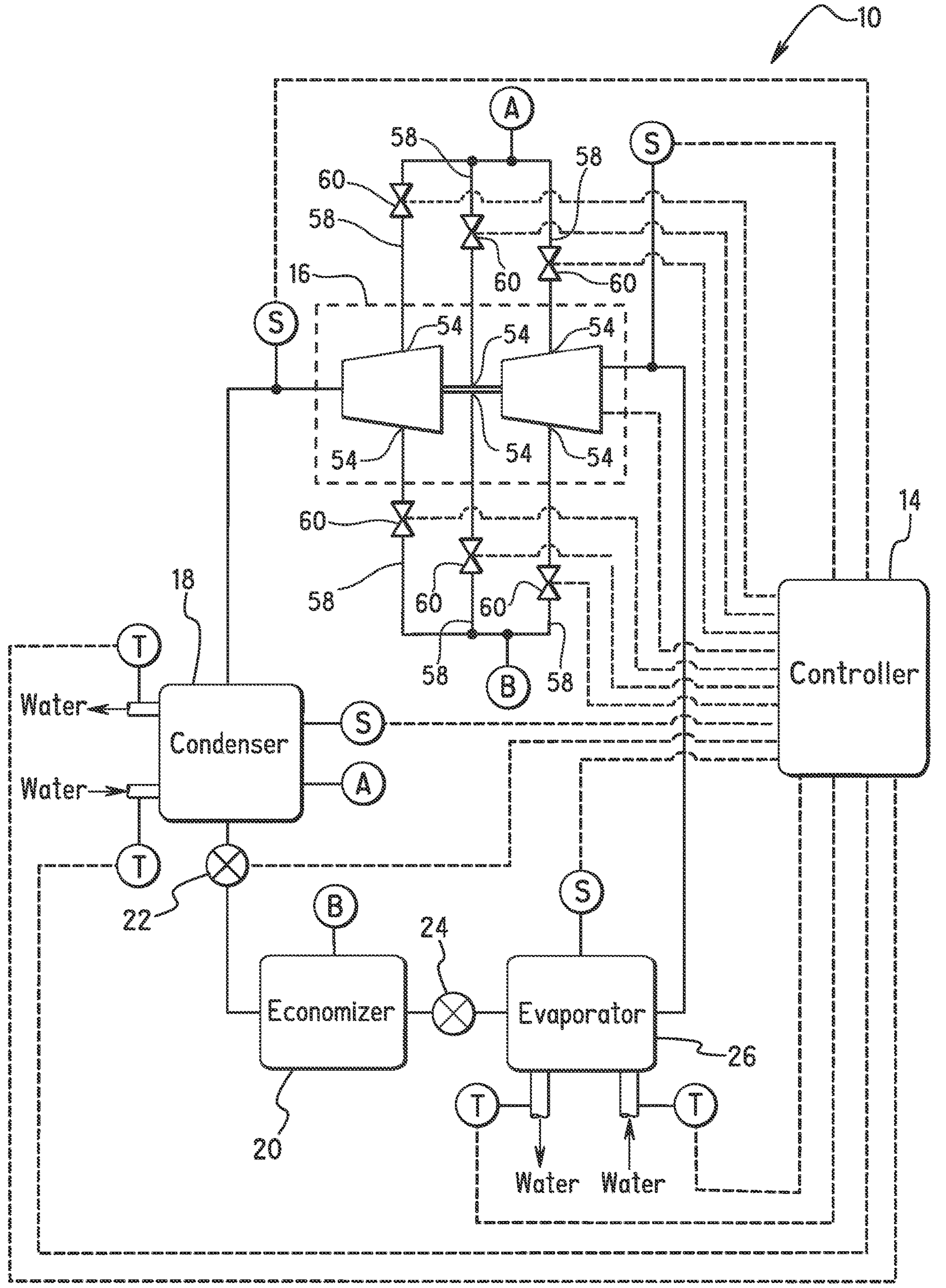
FIG. 1 illustrates a chiller in accordance with an embodiment of the present invention in which a compressor includes an injection port.

Referring initially to FIG. 1, a chiller system 10, which includes at least one injection port in accordance with an exemplary embodiment of the present invention, is illustrated. The chiller system 10 is preferably a water chiller that utilizes cooling water and chiller water in a conventional manner. The chiller system 10 illustrated herein is a two-stage chiller system. However, it will be apparent to those skilled in the art from this disclosure that the chiller system 10 could be a single stage chiller system or a multiple stage chiller system including three or more stages.

The chiller system 10 basically includes a chiller controller 14, a compressor 16, a condenser 18, an economizer 20, expansion valves 22 and 24, and an evaporator 26 connected together in series to form a loop refrigeration cycle. In addition, various sensors S and T may be disposed throughout the circuit of the chiller system 10. The chiller system 10 may include orifices instead of the expansion valves 22 and 24.

Figure 4A:
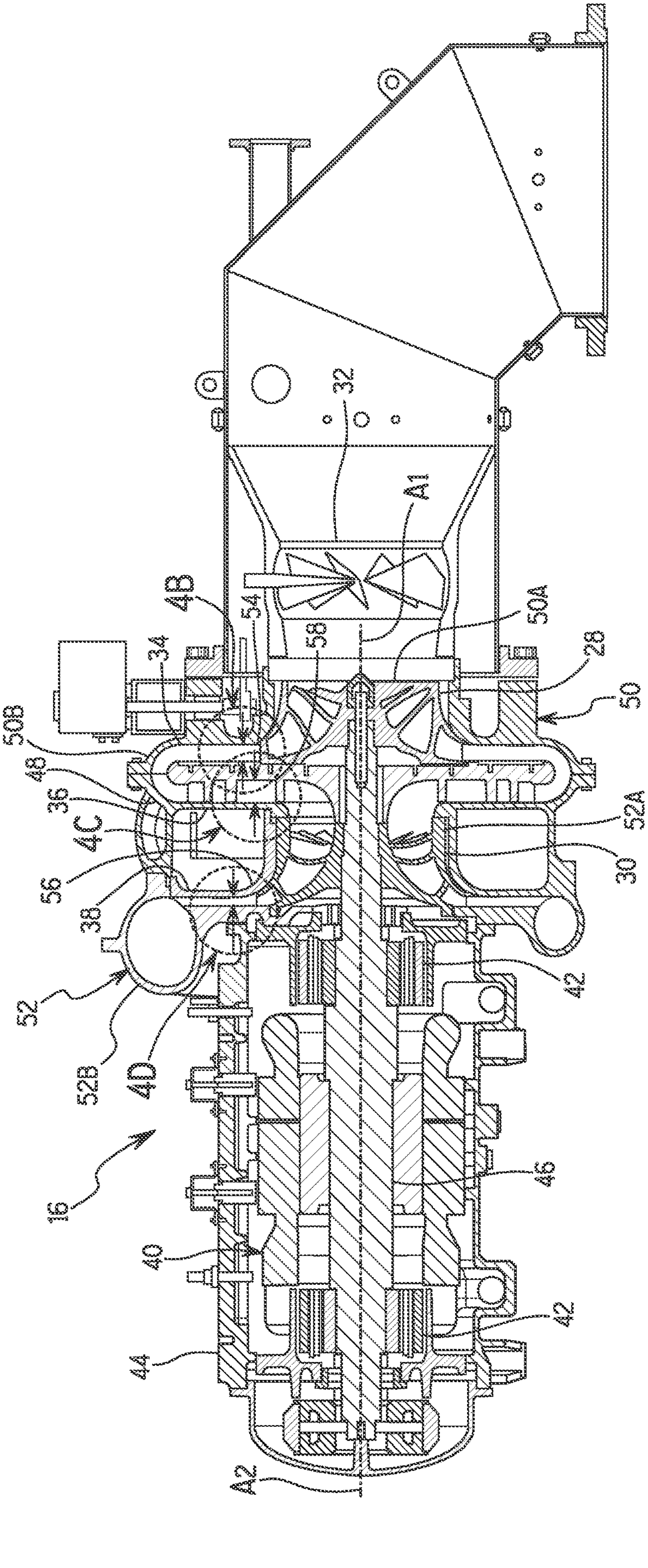
FIG. 4A is an elevational view in cross section of a two-stage centrifugal compressor of the chiller of FIG. 1.

Referring to FIGS. 1 and 4A, the compressor 16 is a two-stage centrifugal compressor in the illustrated embodiment. The compressor 16 illustrated herein is a two-stage centrifugal compressor which includes two impellers. However, the compressor 16 can be a single stage centrifugal compressor or a multiple stage centrifugal compressor including three or more impellers. Alternatively, the compressor 16 can be a screw compressor. The two-stage centrifugal compressor 16 of the illustrated embodiment includes a first stage impeller 28 and a second stage impeller 30. The centrifugal compressor 16 further includes a first stage inlet guide vane 32, a first diffuser/volute 34, a second stage inlet guide vane 36, a second diffuser/volute 38, a compressor motor 40, and a magnetic bearing assembly 42 as well as various sensors (only some shown).

The chiller controller 14 receives signals from the various sensors and controls the inlet guide vanes 32 and 36, the compressor motor 40, and the magnetic bearing assembly 42, as explained in more detail below. Refrigerant flows in order through the first stage inlet guide vane 32, the first stage impeller 28, the first diffuser, 34, the return channel 48, the second stage inlet guide vane 36, the second stage impeller 30, and the second diffuser 38. The inlet guide vanes 32 and 36 control the flow rate of refrigerant gas into the impellers 28 and 30, respectively. The impellers 28 and 30 increase the velocity of refrigerant gas, generally without changing pressure. The motor speed determines the amount of increase of the velocity of refrigerant gas. The diffusers/volutes 34 and 38 increase the refrigerant pressure. The diffusers/volutes 34 and 38 are non-movably fixed relative to a compressor casing 44. The compressor motor 40 rotates the impellers 28 and 30 via a shaft 46. Alternatively, a first motor can drive the first impeller 28 and a second motor 30 can drive the second impeller 30. The magnetic bearing assembly 42 magnetically supports the shaft 46. Alternatively, the bearing system may include a roller element, a hydrodynamic bearing, a hydrostatic bearing, an oil bearing, and/or a magnetic bearing, or any combination of these. In this manner, the refrigerant is compressed in the centrifugal compressor 16.

In operation of the chiller system 10, the first stage impeller 28 and the second stage impeller 30 of the compressor 16 are rotated, and the refrigerant of low pressure in the chiller system 10 is drawn by the first stage impeller 28. The flow rate of the refrigerant is adjusted by the inlet guide vane 32. The refrigerant drawn by the first stage impeller 28 is compressed to intermediate pressure, the refrigerant pressure is increased by the first diffuser/volute 34, and the refrigerant is then introduced to the second stage impeller 30. The flow rate of the refrigerant is adjusted by the inlet guide vane 36. The second stage impeller 30 accelerates and compresses the refrigerant, and the refrigerant pressure is increased from an intermediate pressure to a high pressure by the second diffuser/volute 38. The high-pressure gas refrigerant is then discharged to the chiller system 10.

Figure 3:
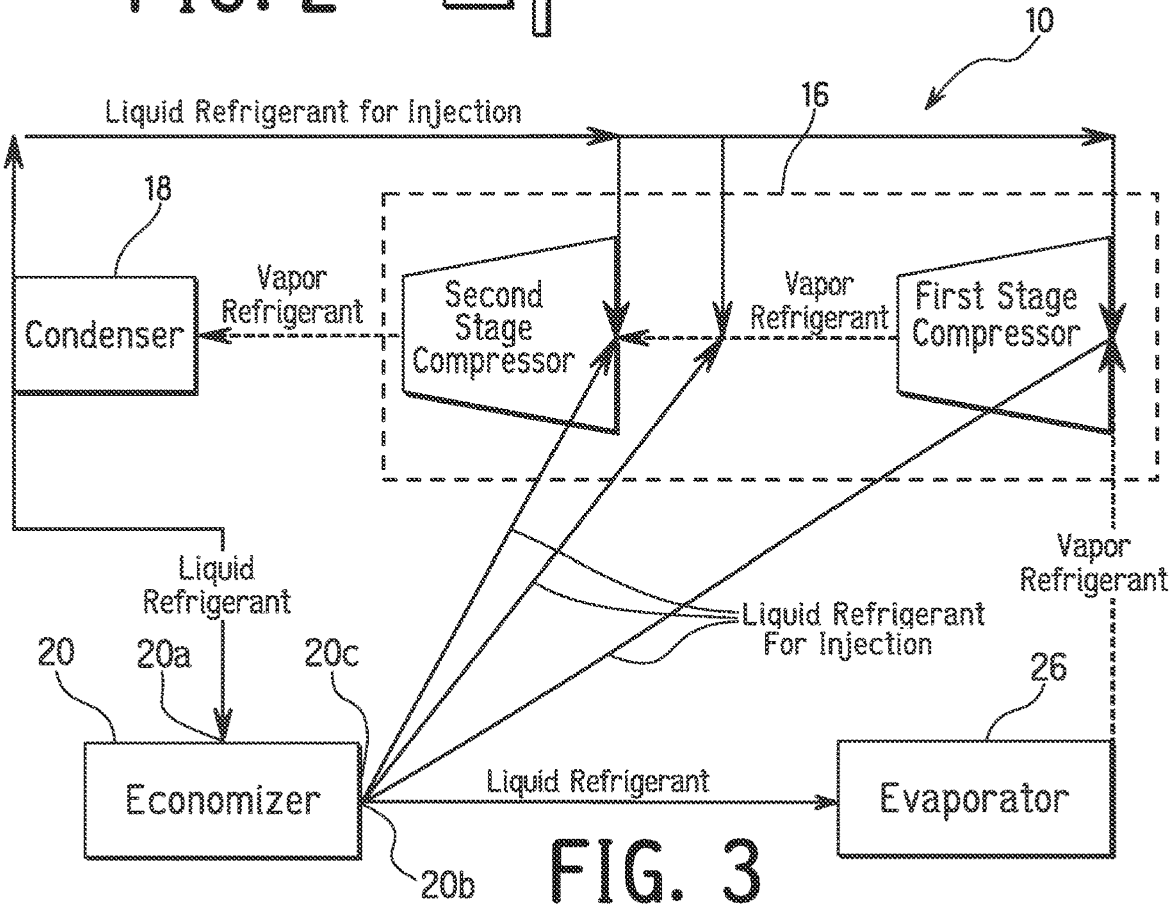
FIG. 3 illustrates the chiller of FIG. 1 in which the compressor includes a plurality of injection ports.

Referring to FIG. 3, the chiller system 10 has the economizer 20 in accordance with the present invention. During normal operation, the economizer 20 is connected to a return channel 48 of the compressor 16 to inject gas (vapor) refrigerant into the return channel 48 of the compressor 16, as explained in more detail below. In the chiller system 10, the economizer 20 is disposed between the condenser 18 and the evaporator 26. Under some conditions, the economizer may be connected to the first diffuser 34, the return channel 48, and/or the second diffuser 38 of the compressor 16 to inject liquid refrigerant, as explained in more detail below.

The economizer 20 includes an inlet port 20*a*, a liquid outlet port 20*b*, and a gas outlet port 20*c*. The inlet port 20*a* is provided to introduce the two-phase refrigerant from the condenser 18 into the economizer 20. The liquid outlet port 20*b* is provided to discharge the liquid refrigerant separated from the two-phase refrigerant to the evaporator 26. The gas outlet port 20*c* is provided to discharge the gas refrigerant separated from the two-phase refrigerant provided to the economizer 20. The flow rate of the refrigerant flowing into the inlet port 20*a* is controlled by the expansion valve 22 which is disposed between the condenser 18 and the economizer 20.

In operation, the refrigerant cooled to condense in the condenser 18 is decompressed to an intermediate pressure by the expansion valve 22, and is then introduced into the economizer 20. The two-phase refrigerant introduced from the inlet port 20*a* into the economizer 20 is separated into gas refrigerant and liquid refrigerant by the economizer 20. Under some conditions, the gas refrigerant is injected from the gas outlet port 20*c* of the economizer 20 into the return channel 48 of the compressor 16 via a pipe. Under some conditions, the liquid refrigerant is guided from the liquid outlet port 20*b* to the evaporator 26, or can be stored in a liquid storage portion of the economizer 20, or can be injected into the return channel 48 of the compressor 16 via a pipe.

The gas refrigerant injected into the return channel 48 of the compressor 16 is then mixed with the refrigerant of intermediate pressure compressed by the first stage impeller 28 of the compressor 16. The mixed refrigerant flows to the second stage impeller 30 to be further compressed.

In some embodiments, the casing 44 includes a first casing 50 and a second casing 52, as shown in FIG. 4A. The first casing 50 includes a first inlet portion 50A and a first outlet portion 50B. The first stage impeller 28 is disposed in the first inlet portion 50A of the first casing 50 and is rotatable about a first rotation axis A1. The first diffuser 34 is disposed downstream from the first stage impeller 28. The second casing 52 includes a second inlet portion 52A and a second outlet portion 52B. The second stage impeller 30 may be disposed in the second inlet portion 52A of the second casing 52 and is rotatable about a second rotation axis A2. The first and second rotation axes A1 and A2 can be collinear as shown in FIG. 4A, or can be radially offset. The second diffuser 38 is disposed downstream from the second stage impeller 30. The return channel 48 connects the first diffuser 34 to the inlet of the second impeller 30. The first and second casings 50 and 52 can be unitarily formed as a single member to form the casing 44, or the first and second casings 50 and 52 can be separately formed and connected to form the casing 44.

Figure 2:
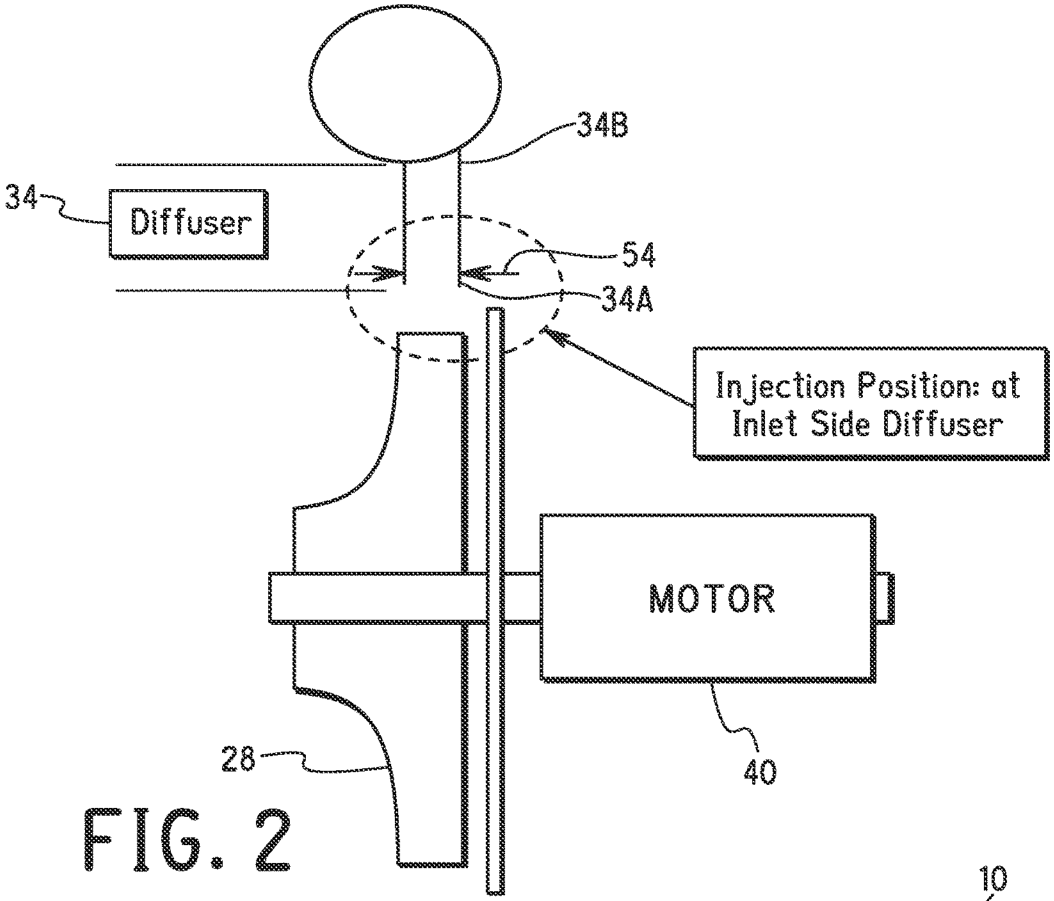
FIG. 2 is a schematic diagram illustrating an impeller, a diffuser, and a motor of the compressor of FIG. 1 in which an injection port is located in an inlet side of the diffuser.

The compressor 16 includes at least one injection port 54 configured and arranged to supply liquid refrigerant to the compressor 16 from a source, such as the condenser 18 or the economizer 20. As shown in FIGS. 1 and 2, the at least one injection port 54 can be located in various positions within the compressor 16, such as, but not limited to, the first stage diffuser 28, the return channel flow path 48, and the second stage diffuser 38. The liquid refrigerant can be supplied from any suitable source, such as, but not limited to, the condenser 18 and the economizer 20.

Figure 4B:
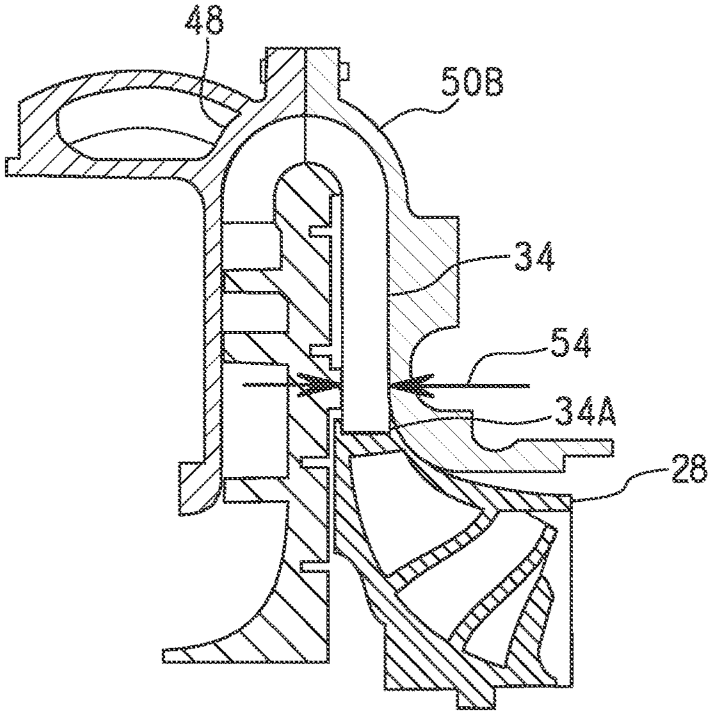
FIG. 4B is a detailed view of FIG. 4A illustrating a first impeller, a first diffuser, a return channel, and an injection port located in the first diffuser.

As shown in FIGS. 2, 4A and 4B, an injection port 54 is located within the first diffuser 34. The injection port 54 can be located at any suitable position within the first diffuser 34. Preferably, the injection port 54 is disposed near the joint between the first stage impeller 28 and the first diffuser 34. The injection port 54 is disposed downstream of the joint between the first stage impeller 28 and the first diffuser 34 near a trailing edge of the first stage impeller 28. A leakage flow path can be generated at the joint between the first stage impeller 28 and the first diffuser 34 because the first stage impeller moves relative to the first diffuser 34. By disposing the injection port downstream of this joint, the high velocity refrigerant vapor emitted from the first stage impeller 28 prevents the injected liquid refrigerant from traveling upstream to the joint between the first stage impeller 28 and the first diffuser 34. The high velocity refrigerant vapor carries the injected liquid refrigerant downstream and substantially prevents the injected liquid refrigerant from traveling upstream.

The injection port 54 is preferably located proximal the trailing edge of the first stage impeller 28, but downstream of the joint between the first impeller 28 and the first diffuser 34. Flow separation occurs within the rotating first stage impeller 28. Injecting the higher pressure liquid refrigerant into the low pressure vapor refrigerant from the impeller substantially prevents the flow separation occurring in the first stage impeller 28 from propagating to the first diffuser 34. The closer the injection port 54 is to the trailing edge of the first stage impeller 28, the higher the velocity of the emitted refrigerant vapor and the lower the pressure.

The refrigerant vapor entering the first diffuser 34 has a high velocity jet flow down the middle of the flow path and a slower velocity separated flow near the walls of the flow path of the first diffuser 34. The separated flow creates eddies in the flow path. Injecting the liquid refrigerant into the first diffuser 34 adds energy to the flow and breaks up the distinction between the jet flow and the separated flow. The injected liquid refrigerant substantially suppresses the flow separation. The injected liquid refrigerant goes through a phase change, from a liquid to a vapor, and slows the flow of the refrigerant vapor.

Figure 5:
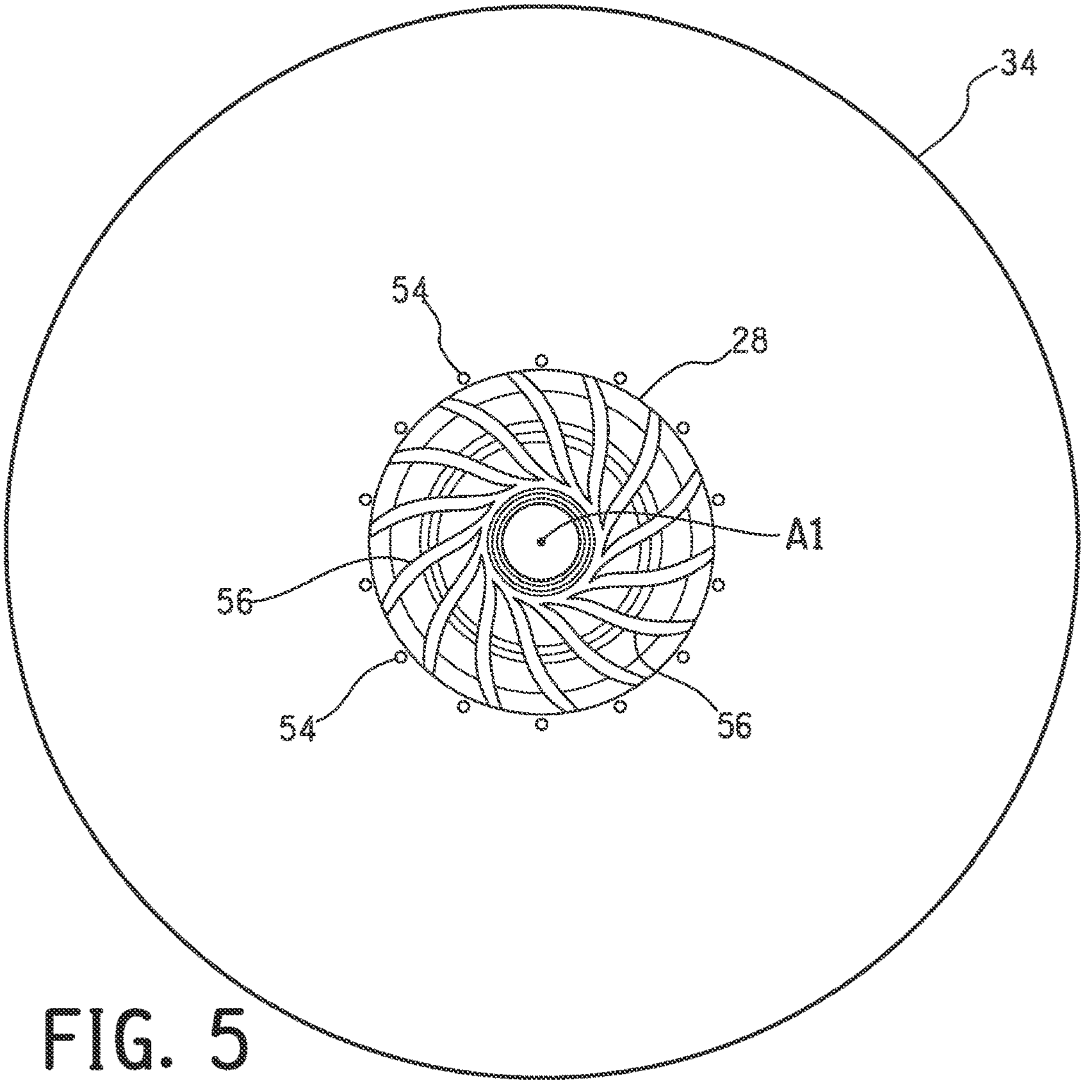
FIG. 5 is a front plan view of an impeller of the two-stage centrifugal compressor of FIG. 4A in which a plurality of injection ports are disposed in the diffuser.

As shown in FIG. 5, a plurality of injection ports 54 may be disposed circumferentially around the first diffuser 34. The number of injection ports 54 is illustrated as being equal to the number of vanes 56 of the first stage impeller 28, although the diffuser can have any suitable number of injection ports 54. As shown in FIG. 5, the first stage impeller 28 has fourteen vanes 56, and the first diffuser 34 includes fourteen injection ports 54.

Figure 9:
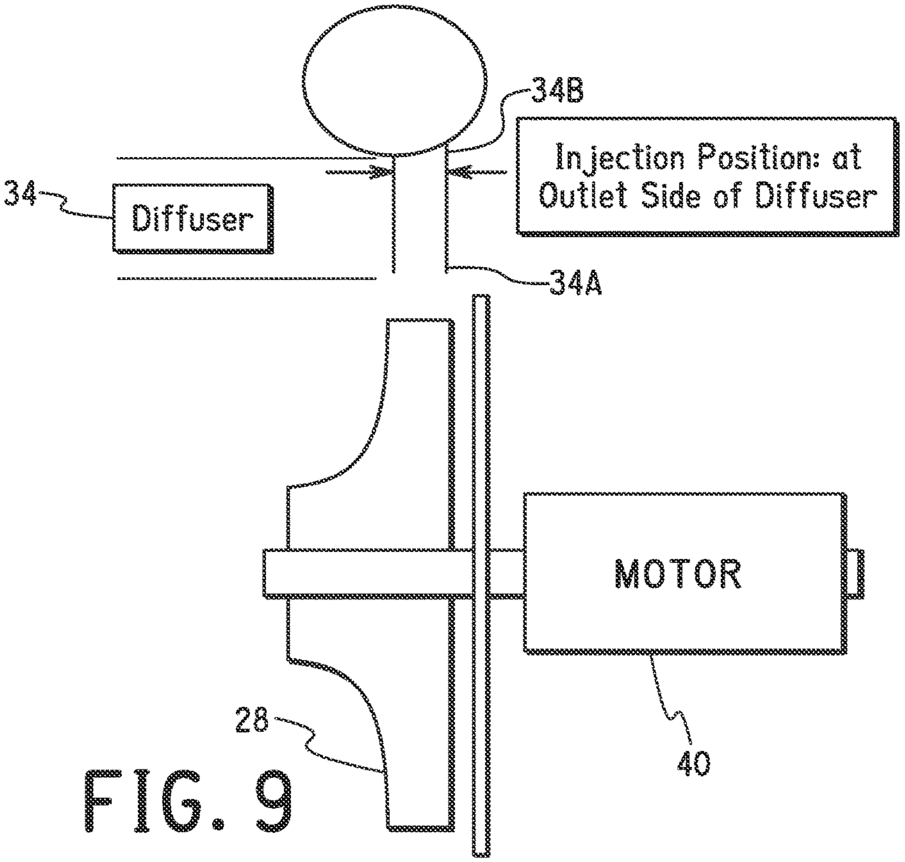
FIG. 9 is a schematic diagram illustrating an impeller, a diffuser, and a motor of the compressor of FIG. 1 in which an injection port is located in an outlet side of the diffuser.
Figure 10:
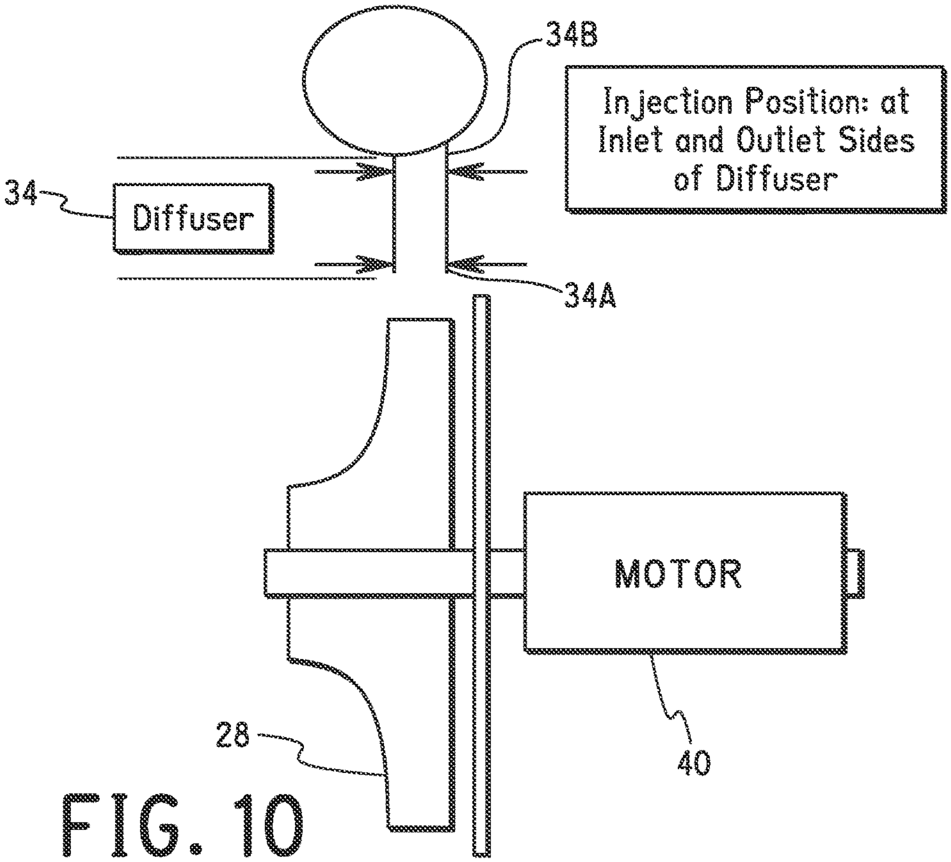
FIG. 10 is a schematic diagram illustrating an impeller, a diffuser, and a motor of the compressor of FIG. 1 in which an injection port is located in an inlet side and an outlet side of the diffuser.

As shown in FIG. 2, the first diffuser 34 has an inlet side, or an upstream edge, 34A and an outlet side, or a downstream edge, 34B. The inlet side 34A is disposed proximal to the first impeller 28 and upstream of the outlet side 34B. In other words, the outlet side 34B is disposed downstream of the inlet side 34A. The plurality of injection ports 54 may be disposed in the inlet side 34A of the first diffuser 34. Alternatively, as shown in FIG. 9, the plurality of injection ports 54 are disposed in the outlet side 34B of the first diffuser 34. Alternatively, as shown in FIG. 10, the plurality of injection ports 54 are disposed in the inlet side 34A and the outlet side 34B of the first diffuser 34. The injection ports 54 can be disposed as shown in FIG. 5 in which the injection ports 54 are arranged around an entire circumference of the first diffuser 34. Alternatively, the injection ports 54 can be disposed on only one side of the first diffuser 34, such as only in the top portion.

Figure 7:
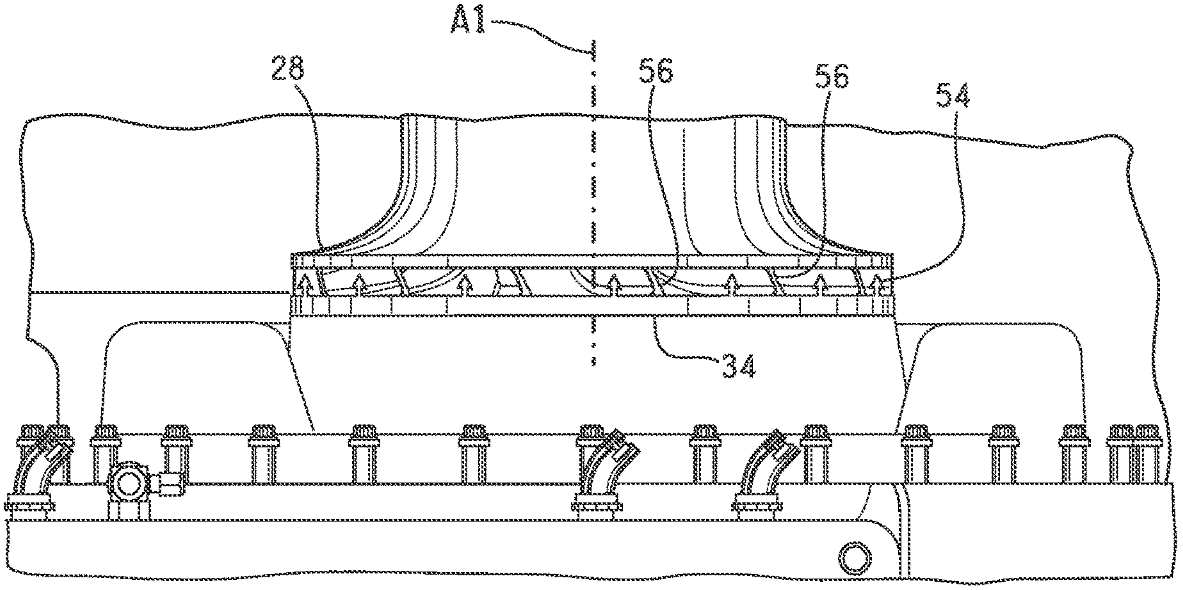
FIG. 7 is a top plan view of a trailing edge of the first impeller in which the injection ports are aligned with an axis of rotation of the impeller.
Figure 8:
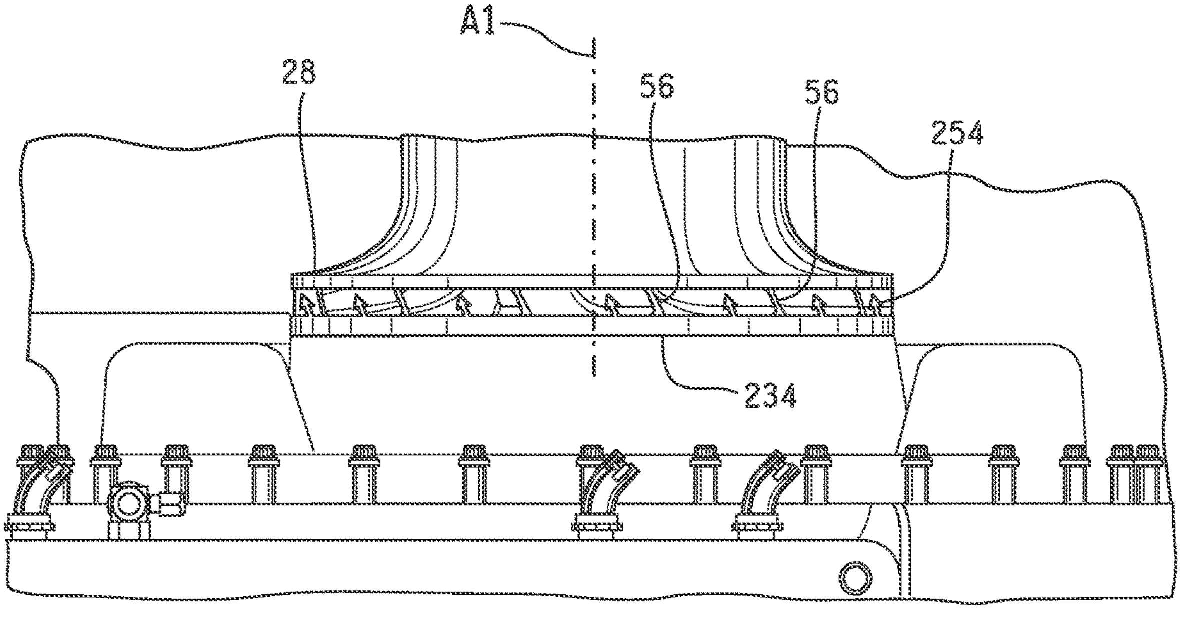
FIG. 8 is a top plan view of the trailing edge of the first impeller in which the injection ports are angularly disposed relative to the axis of rotation of the impeller.

As shown in FIG. 7, the injection ports 54 are disposed in the first diffuser 34 and aligned with the axis of rotation A1 of the first stage impeller 28. As shown in FIG. 8, the injection ports 254 are disposed in the first diffuser 234 such that the injection ports 254 are angularly disposed relative to the axis of rotation A1 of the first stage impeller 28. Each of the injection ports 254 is angled circumferentially.

Figure 6:
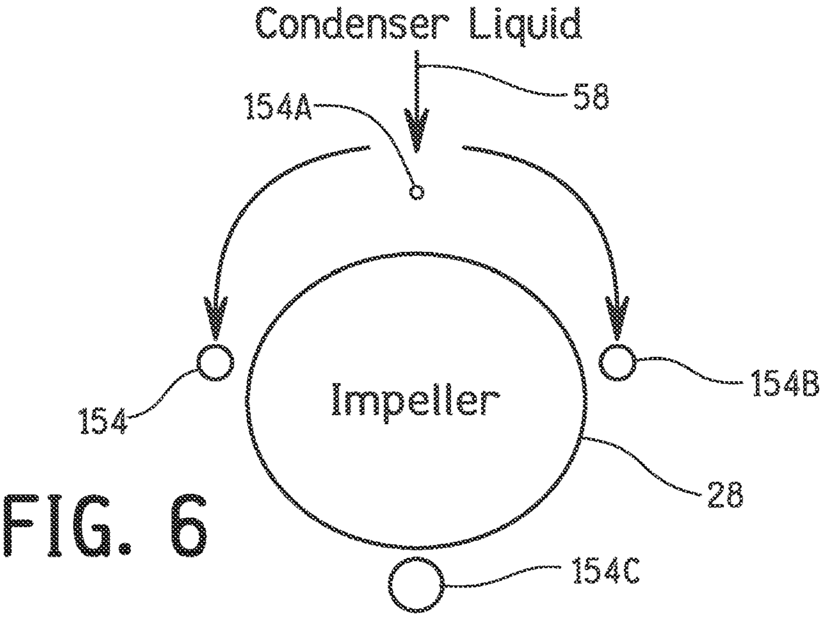
FIG. 6 is a top plan view of the first impeller of FIG. 5 in which the injection ports have different sizes.

As shown in FIG. 6, the injection ports 154 are disposed in the first diffuser and have varying diameters based on proximity to the injection passage 58. The injection passage 58 supplies liquid refrigerant from the source, such as the condenser 18 or the economizer 20, to the injection ports 154. The pressure of the supplied liquid refrigerant is largest closest to the point where the liquid refrigerant arrives. The injection ports 154A nearest the point where the liquid refrigerant arrives have the smallest diameters of the injection ports. The diameters of the injection ports 154 increase as the distance from the arrival point of the liquid refrigerant increases. The injection ports 154A farthest from the arrival point of the liquid refrigerant have the largest diameters, and the injection ports 154B have a diameter between the diameters of the injection ports 154A and 154C. The pressure of the supplied liquid refrigerant deceases as the distance from the arrival point increases. Increasing the diameter of the injection port 154 with the increased distance from the arrival point substantially maintains a uniform injection amount of liquid refrigerant from all the injection ports 154A, 154B and 154C in the first diffuser. In other words, the injection ports 154 having the largest operating pressure have the smallest diameters, and the injection ports 154 having the lowest operating pressure have the largest diameters.

Figure 4C:
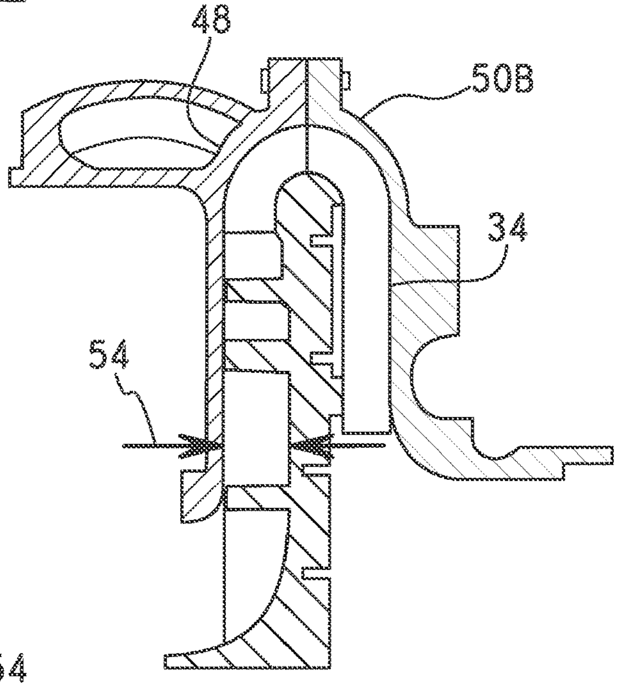
FIG. 4C is a detailed view of FIG. 4A illustrating a first diffuser, a return channel, and an injection port located in the return channel.
Figure 4D:
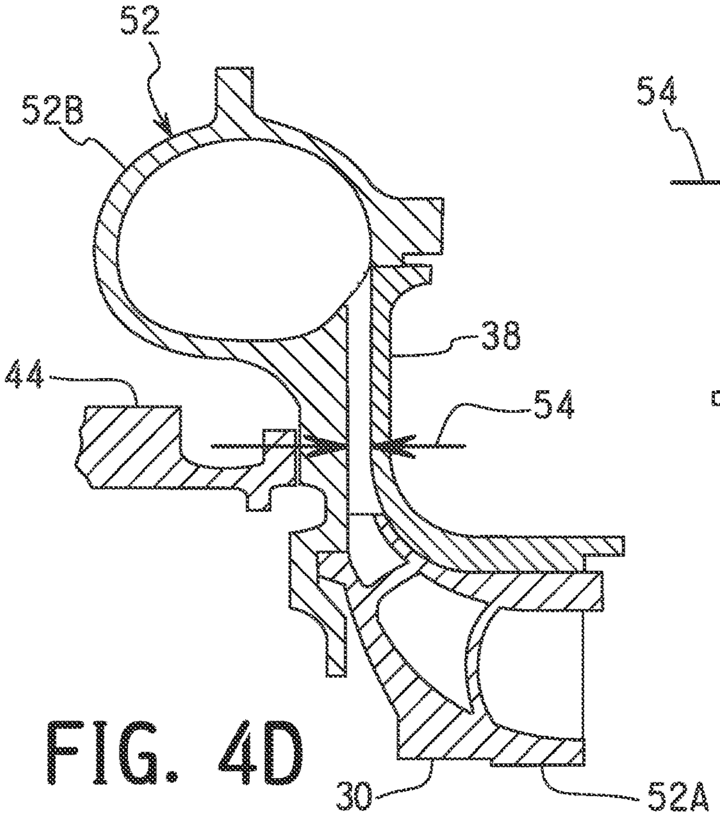
FIG. 4D is a detailed view of FIG. 4A illustrating a second impeller, a second diffuser, and an injection port located in the second diffuser.

As shown in FIG. 4B, an injection port 54 can be formed in the first diffuser 34. As shown in FIG. 4D, an injection port 56 can be formed in the second diffuser 38. The injection port 56 in the second diffuser 38 is configured substantially similarly to the injection port 54 formed in the first diffuser 34. As shown in FIG. 4C, an injection port 54 can be formed in the return channel 48 to substantially suppress flow separation from forming in the return channel 48. The injection port 54 formed in the return channel 48 is configured substantially similarly to the injection port 54 formed in the first diffuser 34.

An injection passage 58 is connected to the at least one injection port 54 to supply liquid refrigerant thereto. As shown in FIG. 3, the liquid refrigerant is preferably supplied from at least one of the condenser 18 and the economizer 20. Liquid refrigerant is supplied to at least one of the first diffuser 34, the second diffuser 38 and the return channel 48. Each injection port 54 has an injection passage 58 supplying liquid refrigerant from a source, such as the condenser 18 and the economizer 20.

As shown in FIGS. 3-5, the condenser 18 and the economizer 20 supply liquid refrigerant to the injection ports located within the first diffuser 34, the second diffuser 38, and the return channel 48. An injection passage 58 may connect the condenser 18 and the injection port 54 in the first diffuser 34. An injection passage 58 may connect the condenser 18 and the injection port 54 in the second diffuser 38. An injection passage 58 may connect the condenser 18 and the injection port 54 in the return channel 48. An injection passage 58 may connect the economizer 20 and the injection port 54 in the first diffuser 34. An injection passage 58 may connect the economizer 20 and the injection port 54 in the second diffuser 38. An injection passage may connect the economizer 20 and the injection port in the return channel 48. Any combination of sources, injection passages 58 and injection ports 54 can be used. In a preferred embodiment, for example, the chiller 10 includes an injection passage 58 connecting the condenser 18 and the injection port 54 in the first diffuser 34, an injection passage 58 connecting the condenser 18 and the injection port 54 in the second diffuser 38, and an injection passage 58 connecting the economizer 20 and the injection port 54 in the return channel 48.

In another embodiment, for example, liquid refrigerant from the economizer 20 is injected in the first diffuser 34, and liquid refrigerant from the condenser 18 is injected in the second diffuser 38. The economizer pressure is lower than the condenser pressure. The first diffuser pressure is lower than the second diffuser pressure. Injecting liquid refrigerant from the condenser 18 into the second diffuser 38 and from the economizer 20 into the first diffuser 34 maintains pressure differentials at the respective injection ports 54.

In some embodiments, each injection passage 58 includes a valve 60 that is controllable to control the flow of liquid refrigerant to the injection port 54, as shown in FIGS. 1 and 2. The valve 60 is controlled in any suitable manner between a closed position in which liquid refrigerant is prevented from being supplied to the injection port 54, and an open position in which liquid refrigerant is supplied to the injection port 54. The valve 60 is connected to the controller 14 to be controlled to control the flow of liquid refrigerant through the injection passage 58. The valve 60 can be closed during a high flow condition, which has less flow separation, and opened during a low flow condition, which has greater flow separation.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A two stage chiller comprising:

a first centrifugal compressor including
  a first impeller rotatable about a first rotation axis, and
  a first diffuser disposed downstream from the first impeller;
a second centrifugal compressor including
  a second impeller rotatable about a second rotation axis, and
  a second diffuser disposed downstream from the second impeller;
at least one motor arranged and configured to rotate the first impeller and the second impeller;
a return channel flow path connecting the first diffuser to the second impeller;
a condenser;
an economizer;
an evaporator connected in series with the first stage centrifugal compressor, the second stage centrifugal compressor, the condenser, and the economizer;
a plurality of injection ports within the return channel flow path; and
at least one injection passage connected to the plurality of injection ports, the at least one injection passage being arranged and configured to deliver liquid refrigerant from the economizer.

* * * * *